United States Patent
Sim et al.

(10) Patent No.: US 7,526,057 B2
(45) Date of Patent: Apr. 28, 2009

(54) DECAY HEAT REMOVAL SYSTEM FOR LIQUID METAL REACTOR

(75) Inventors: Yoon Sub Sim, Daejeon (KR); Seong O. Kim, Daejeon (KR); Won Dae Jeon, Seoul (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 11/926,219

(22) Filed: Oct. 29, 2007

(65) Prior Publication Data
US 2008/0219397 A1 Sep. 11, 2008

Related U.S. Application Data

(62) Division of application No. 10/969,722, filed on Oct. 20, 2004, now Pat. No. 7,308,070.

(30) Foreign Application Priority Data
Jan. 2, 2004 (KR) .................. 10-2004-0000019

(51) Int. Cl.
*G21C 9/00* (2006.01)
(52) U.S. Cl. .................. 376/299; 376/298; 376/404; 376/403; 376/405
(58) Field of Classification Search ............... 376/299, 376/298, 404, 403, 405
See application file for complete search history.

(56) References Cited

U.S. PATENT DOCUMENTS

| | | | |
|---|---|---|---|
| 4,382,907 A | 5/1983 | Robin | |
| 4,737,337 A | 4/1988 | Garabedian et al. | |
| 4,765,948 A | 8/1988 | DeLuca et al. | |
| 4,780,270 A | 10/1988 | Hundal et al. | |
| 4,832,904 A | 5/1989 | Thevenin | |
| 4,909,981 A | 3/1990 | Garabedian | |
| 5,021,211 A | 6/1991 | Hunsbedt et al. | |
| 5,158,741 A | 10/1992 | Boardman et al. | |
| 5,223,210 A | 6/1993 | Hunsbedt et al. | |
| 5,265,136 A | 11/1993 | Yamazaki et al. | |
| 5,406,602 A | 4/1995 | Hunsbedt et al. | |
| 5,499,277 A | 3/1996 | Hunsbedt | |
| 6,185,269 B1 | 2/2001 | Hui | |
| 2002/0070486 A1 | 6/2002 | Kim et al. | |

*Primary Examiner*—Rick Palabrica
(74) *Attorney, Agent, or Firm*—The Webb Law Firm

(57) ABSTRACT

A decay heat removal system for a liquid metal reactor in which a decay heat exchanger (DHX) is installed concentrically with an intermediate heat exchanger (IHX) in the same cylinder which separates the DHX and IHX from the reactor pool fluid, and serves to remove the reactor core decay heat. The cylinder surrounds the IHX and DHX, and has an open top portion protruding out of the level of the fluid in a hot pool, a bottom portion connected to a cold pool and a guide pipe for allowing the passage of the fluid from the hot pool into the IHX. The decay heat removal system can remove decay heat immediately after occurrence of an accident, thereby improving the safety of a nuclear plant.

4 Claims, 10 Drawing Sheets

DECAY HEAT REMOVAL SYSTEM FOR LIQUID METAL REACTOR

CROSS REFERENCE TO RELATED APPLICATIONS

This application is a division of co-pending U.S. patent application Ser. No. 10/969,722 filed Oct. 20, 2004, entitled "Stable and Passive Decay Heat Removal System for Liquid Metal Reactor", which is incorporated by reference herein in its entirety.

BACKGROUND OF THE INVENTION

1. Field of the Invention

The present invention relates to a decay heat removal system of a liquid metal reactor, and introduces a new heat exchange system which integrates a decay heat removal heat exchanger or decay heat exchanger (DHX) and an intermediate heat exchanger (IHX). The new heat exchange system makes it possible for effective decay heat removal to start immediately after an occurrence of an accident while maintaining the complete passivity of the decay heat removal operation. By this invention, passive, proper and stable cooling of the nuclear core can be achieved from the initial stage of an accident.

2. Description of Related Art

Liquid Metal Reactor

A liquid metal reactor (LMR) generates heat using fast neutrons from nuclear fission, and simultaneously converts a non-fissile material U238 into a fissile material Pu239, thereby serving as a breeding reactor by producing more fissile material than the fuel it consumes. Further, the liquid metal reactor is a reactor which can burn radioactive nuclides produced from other type reactors such as water-cooled reactors, and thus can reduce substantially the storage load of high level radioactive wastes generated from other type reactors.

The above liquid metal reactors are divided into loop type reactors and pool type reactors. The loop type reactor has a structure such that heat transfer devices of its primary heat transport system are installed outside a reactor vessel, and is advantageous in that the heat transfer devices are easily maintained and repaired and the reactor vessel has a simple structure. On the other hand, the pool type reactor has a structure such that its primary heat transport system including the equipment such as intermediate heat exchangers (IHXs) and pumps are installed in a reactor vessel, and is advantageous in that the leakage of the coolant due to the breakage of a pipeline of the primary system is prevented and a large amount of the coolant is contained in the primary system, thus having a high thermal inertia that makes the system transient speed slow and provides a long grace time in an accident.

The liquid metal reactor uses liquid metal as coolant, and preferably uses sodium (Na) having an excellent heat removal capacity as coolant.

Decay Heat Removal Type

Conventional liquid metal reactors use various types of decay heat removal systems for removing decay heat from the nuclear core in an accident. Hereinafter, a pool type reactor will be exemplarily described.

FIG. 1 is a longitudinal-sectional view of a conventional active decay heat removal system.

In FIG. 1, a nuclear core 11 installed in a reactor 10 heats sodium (Na) 17 and feeds the heated sodium 17 into a hot pool 18, which is positioned in the upper part of the reactor 10. The reactor includes conventional pumps 12 for circulating the liquid sodium. The sodium 17 in the hot pool 18 transfers its heat to intermediate heat exchangers (IHXs) 13, thus being cooled. The cooled sodium 17 is fed into the cold pool 19, which is positioned in the lower part of the reactor 10, and again enters the core 11. The IHXs 13 transfer heat thereof to a steam generation system (not shown), and the steam generation system generates steam, and then generates electricity.

A decay heat exchanger 14 is installed separately from the IHXs 13 in the hot pool 18 of the reactor 10, and a valve 15 is installed in the pipeline connected to the decay heat exchanger 14. The valve 15 serves to prevent heat loss to the outside through the decay heat exchanger 14 when the reactor 10 operates normally. That is, the valve 15 is closed when the reactor 10 operates normally, and is opened in an accident.

In the active decay heat removal system shown in FIG. 1, the switch valve 15 installed in the pipeline connected to the decay heat exchanger 14 needs to be opened in an accident in order to activate heat exchange with the external atmosphere. It means that an active decay heat removal system has weak safety features of requiring the operation of active devices such as a motor and valve 15 and also the supply of electric power from the outside for the operation of the valve 15.

Accordingly, instead of the above active decay heat removal system, there is required a passive decay heat removal system, in which removal of decay heat is automatically activated without relying on active devices.

FIG. 2 illustrates a conventional passive decay heat removal system. The structure of the passive decay heat removal system of FIG. 2 is the same as that of the active decay heat removal system of FIG. 1 in that a nuclear core 21, which is installed in a reactor 20, heats sodium (Na) 27 and feeds via pumps 22 the heated sodium 27 into a hot pool 28, which is positioned in the upper part of the reactor 20, and the sodium (Na) is cooled by exchanging heat in IHXs 23.

In an accident, the normal heat transfer path of the core-IHX-steam generation system is not credited and the sodium in the reactor is heated since the normal heat transfer path is no longer available, and the sodium expands. Consequently, the sodium level X1 in the hot pool 28 rises, and the sodium in the reactor 20 flows over the overflow slot 30. The overflowed sodium 27 directly contacts the wall 31 of a reactor vessel 30, thus transferring its heat to the wall 31 of the reactor vessel 30. The heat transferred to the wall 31 of the reactor vessel 30 is transferred to the air route 26 outside the reactor vessel 30 by radiation and convection heat transfer, and is then transferred to the air flowing in the air route 26 divided by an air separator 24. The air, to which the heat is transferred, continuously flows out to the atmosphere by virtue of the difference in its density along its path, that is, by natural convection. Cold external air is introduced into the reactor vessel 30 through the air path 26. The arrow 25 in the air path 26 represents the flow path of the air.

The above-described passive decay heat removal system is operated completely by the natural phenomena without relying on any operator action or any active device operation at an accident, thus being advantageous in that the reliability of the system operation is very high. However, it takes several hours for the sodium to overflow, that is, it takes several hours for the decay heat removal system to become fully functional and be able to remove the decay heat properly. During this period of time before the system becomes functional, proper heat removal from the reactor pool is not made and it is difficult for the natural circulation flow head to be built up. The flow head is the driving force of the natural circulation in the pool which cools the core. Consequently, the core cooling capability becomes low and the temperature of the nuclear fuel in the core can rise excessively high.

Summarizing the description, in a conventional passive decay heat removal system, the volume of the fluid in the reactor needs to be expanded substantially for the system to be able to remove decay heat properly, and the expansion of the fluid volume requires time and a rise of the pool temperature, and this feature results in weak safety features that the core cooling capability is not certain during the time period of the volume expansion and the temperature in the reactor may become unnecessarily high.

SUMMARY OF THE INVENTION

Therefore, the present invention has been made in view of the above problems, and it is an object of the present invention to provide a decay heat removal system which can passively and effectively remove the decay heat immediately after the initiation of an accident without relying on any external support such as an operator action or power supply. To achieve the object, the system is designed so that the natural circulation flow head can be properly built and maintained during an accident from the moment immediately after an accident.

According to an aspect of the present invention, the above and other objects of the present invention can be accomplished by the provision of a decay heat removal system for a liquid metal reactor comprising: a reactor vessel including a hot pool for containing a high-temperature fluid discharged from a reactor core and a cold pool which is separated from the hot pool by a partition and contains a low-temperature fluid; an intermediate heat exchanger (IHX) transferring heat from the hot pool to an external steam generation system and positioned in the hot pool, the IHX having a bottom portion connected to the cold pool and discharging the fluid from the hot pool into the cold pool; a decay heat exchanger (DHX) separated form the IHX by a designated distance for transferring reactor core decay heat to the external air; a cylinder surrounding the IHX and the DHX, and having an opened top portion protruding out of the level of the fluid in the hot pool, a bottom portion connected to the cold pool and a guide pipe for allowing the passage of the fluid from the hot pool into the IHX; and a pump for pumping the fluid from the cold pool to the reactor core, whereby the level of the fluid in the cylinder is maintained lower than the level of the fluid in the hot pool during its operation.

According to another aspect of the present invention, there is provided a modified decay heat removal system for a liquid metal reactor comprising: a reactor vessel including a hot pool for containing a high-temperature fluid discharged from a reactor core and a cold pool which is separated from the hot pool by a partition and contains a low-temperature fluid; an intermediate heat exchanger (IHX) transferring heat from the hot pool to an external steam generation system and positioned in the hot pool, the IHX having a bottom portion connected to the cold pool and discharging the fluid from the hot pool into the cold pool; a decay heat exchanger (DHX) separated from the IHX by a designated distance for transferring reactor core decay heat to the external air; a cylinder surrounding the IHX and the DHX, and having an opened top portion protruding out of the level of the fluid in the hot pool, a bottom portion connected to the cold pool and a guide pipe for allowing the passage of the fluid from the hot pool into the IHX; a switch valve installed on the outer wall of the guide pipe in the cylinder and having a buoy floatable on the fluid by buoyancy to switch the flow path from the guide pipe into the cylinder; and a pump for pumping the fluid from the cold pool to the reactor core, whereby the level of the fluid in the cylinder is maintained lower than the level of the fluid in the hot pool during its operation.

BRIEF DESCRIPTION OF THE DRAWINGS

The above and other objects, features and other advantages of the present invention can be more clearly understood from the following detailed description taken in conjunction with the accompanying drawings, in which:

FIGS. 7a and 7b illustrate the operation of the decay heat removal system of FIG. 3, in which FIG. 7a is a schematic view illustrating the decay heat removal system during the normal operation of the pool type reactor, and FIG. 7b is a schematic view illustrating the decay heat removal system in an accident of the pool type reactor;

DETAILED DESCRIPTION OF THE INVENTION

Now, preferred embodiments of the present invention will be described in detail with reference to the annexed drawings. Hereinafter, although the following discussion will present a decay heat removal system for a pool type reactor, this may be also applied to a loop type reactor (through modification more or less or even omission of an element).

Structure of Decay Heat Removal System

Figure 3:
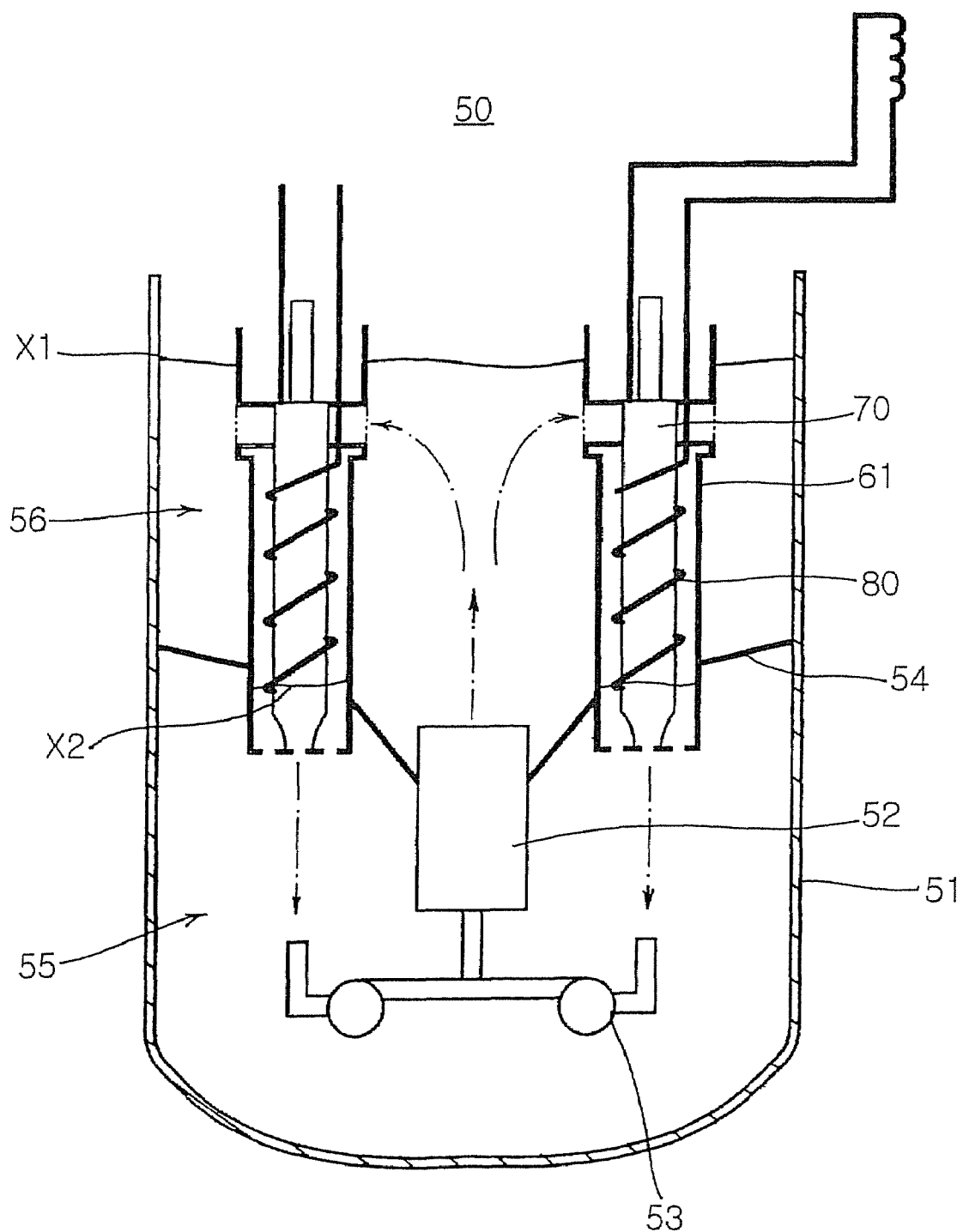
FIG. 3 is a longitudinal-sectional view of a decay heat removal system for a pool type reactor in accordance with a first embodiment of the present invention.
Figure 4:
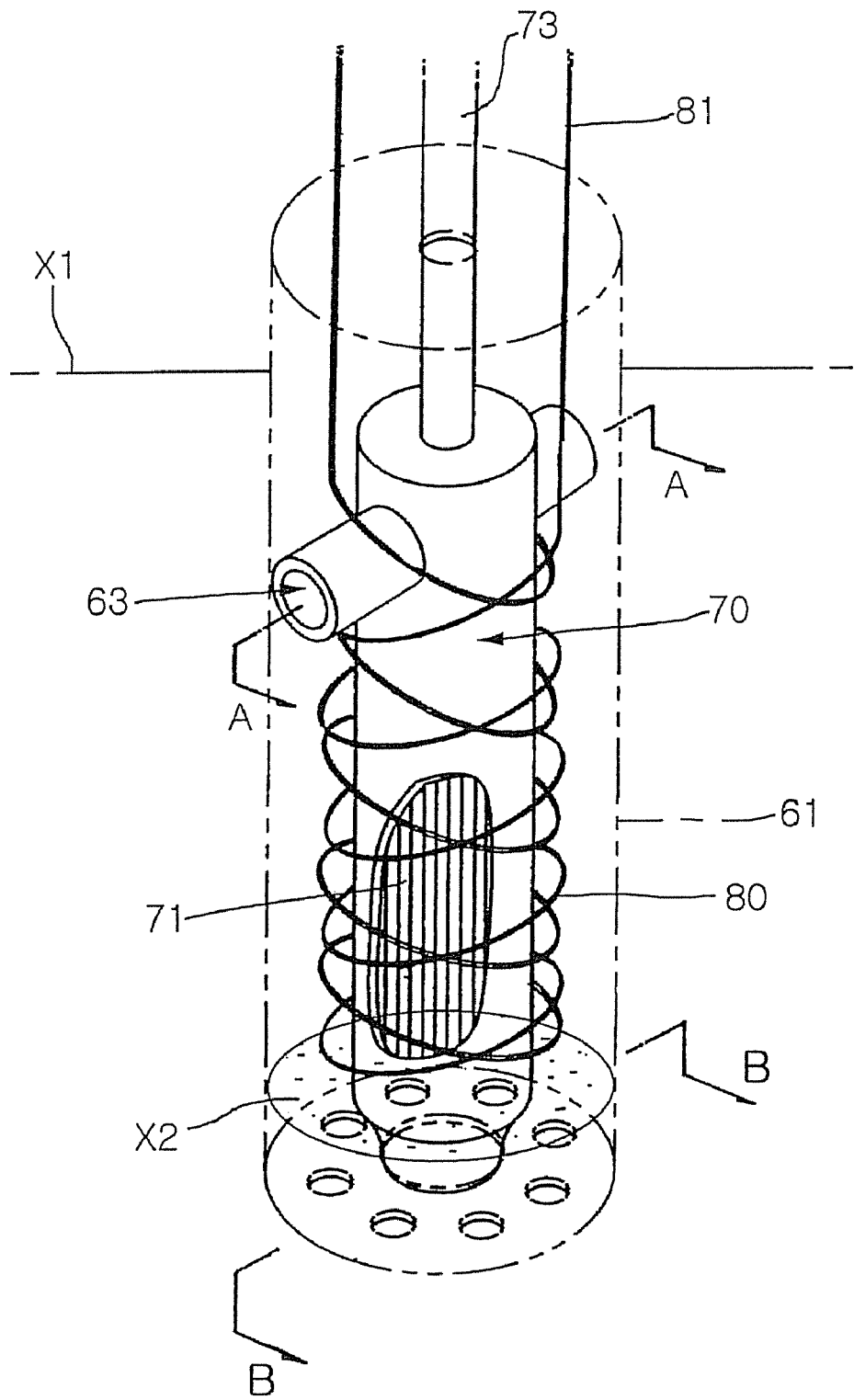
FIG. 4 is a perspective view illustrating the installation of an intermediate heat exchanger (IHX), a decay heat exchanger (DHX) and a cylinder.
Figure 5:
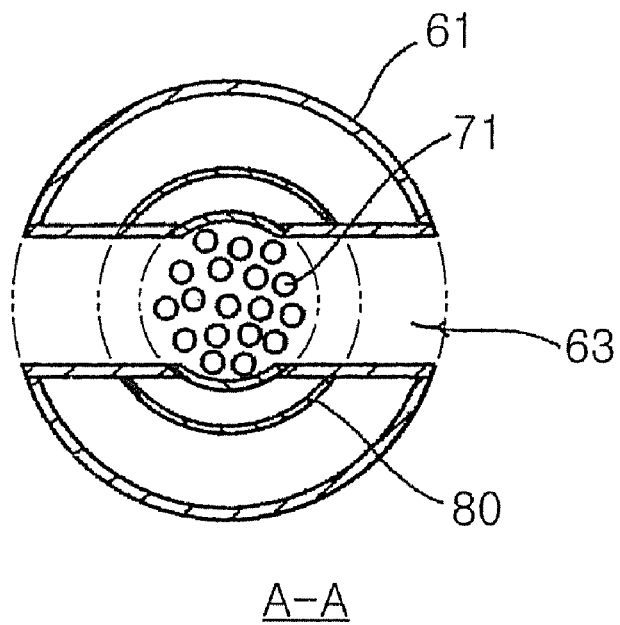
FIG. 5 is a cross-sectional view taken along the line A-A of FIG. 4.
Figure 6:
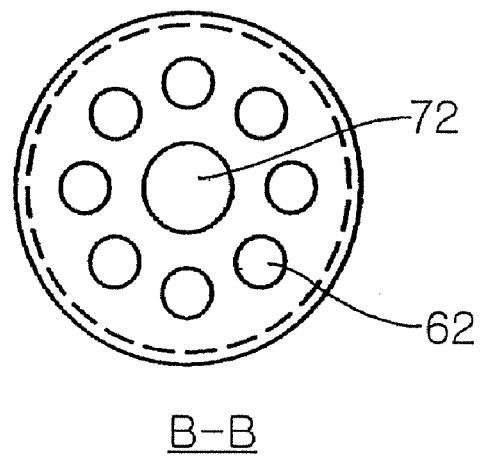
FIG. 6 is a cross-sectional view taken along the line B-B of FIG. 4.

FIG. 3 is a longitudinal-sectional view of a decay heat removal system for a pool type reactor in accordance with the first embodiment of the present invention; FIG. 4 is a perspective view illustrating the installation of an intermediate heat exchanger (IHX), a decay heat exchanger (DHX) and a cylinder; FIG. 5 is a cross-sectional view taken along the line A-A of FIG. 4; and FIG. 6 is a cross-sectional view taken along the line B-B of FIG. 4.

A pool type reactor 50 has intermediate heat exchangers (IHXs) 70 and pumps 53 installed in a reactor vessel 51, which is filled with coolant. As shown in FIG. 3, a hot pool 56 is formed in the reactor vessel 51 of the pool type reactor 50 to contain a hot fluid discharged from a reactor core 52. Further, a cold pool 55 is divided from the hot pool 55 by a partition 54 to contain cooled fluid formed from the hot fluid in the hot pool 55 by heat transfer.

When the heat generated by nuclear fission in the reactor core 52 is transferred to the fluid in the reactor core 52, the heated fluid moves to the hot pool 56 and into the IHXs 70 positioned in the hot pool 56 transferring heat to operating fluid in the IHXs 70.

The IHXs 70 serve to transfer the heat of the hot pool fluid to the intermediate heat transport system (IHTS) (not shown). It means that each of the IHXs 70 is also a part of an intermediate heat transport system (IHTS) that includes a steam generator, a pipeline and a pump, which are positioned outside the reactor vessel 51.

The coolant filling the hot pool 56 and the cold pool 55 of the reactor vessel 51 is made of sodium (Na) having an excellent heat removing capacity.

The IHX 70 has an opening at the bottom communicating with the cold pool 55 so that the IHX 70 discharges the fluid from the hot pool 56 into the cold pool 55 while exchanging heat with the fluid flowing inside the heat transfer tubes 71. That is, as shown in FIG. 4, the fluid from the hot pool 56 is flown along outer surfaces of heat transfer tubes 71 of the IHX 70 to perform heat transfer through convection. Then, the fluid cooled by the heat transfer is discharged into the cold pool through the bottom opening of the IHX 70.

As shown in FIGS. 3 and 4, the decay heat exchanger (DHX) 80 is installed around the IHX 70. That is, as shown in FIGS. 3 and 4, the DHX 80 has heat transfer tubes that are coiled around the IHX 70, spaced at a designated distance from the IHX 70. The DHX 80 consists of the cylinder, heat transfer tubes and the outer wall of the IHX 70 and comes to have the shape of an annular cylinder. The decay heat removal system includes the DHX 80, an external heat exchanger, piping connecting the DHX to the external heat exchanger, in which only the decay heat removal exchanger 80 is installed inside the reactor vessel 51. The external heat exchanger finally discharges the transferred core decay heat to the atmosphere. As in the reactor 50, sodium (Na) is used as operating fluid contained within flow channels of the external heat exchanger and the DHX since it has an excellent heat conductivity. The external heat exchanger installed outside the reactor is located at a higher level than the DHX in order to generate natural convection and can be operated without using a pump. The heat transfer tubes of the DHX 80 are arranged adjacent to the IHX 70. The IHX 70 and the heat transfer tubes of the DHX 80 are primarily separated from the fluid in the hot pool 56 by the cylinder 61. The cylinder 61 surrounds the IHX 70 and the DHX 80. The top portion of the cylinder 61 is open and protrudes from the upper surface of the level X1 of the fluid in the hot pool 56. Further, the bottom portion of the cylinder 61 extends to the cold pool 55.

As shown in FIG. 4, the cylinder 61 has an overall cylindrical shape. The IHX 70 and the heat transfer tubes of the DHX 80 are arranged inside the cylinder 61, and a guide pipe 63 is connected to the IHX 70 so that the fluid can flow from the hot pool 56 into the IHX 70. As shown in FIG. 4, the guide pipe 63 has a cylindrical tubular shape, and is so designed that the fluid flows only into the IHX 70 through the pipe 63.

The bottom portion of the cylinder 61 is connected to the cold pool 55 through the peripheral holes 62 so that the fluid can flow between the cylinder 61 and the cold pool 55. That is, the bottom portion of the cylinder 61 has a central through hole 72 formed in the center thereof, to which the lower end of the IHX 70 is installed. The IHX, the heat transfer tubes of the DHX and the cylinder are constituted into one unit of the heat exchanger system, and a plurality of such heat exchanger systems are arranged in the reactor vessel.

Pumps 53 are installed in the cold pool 55 of the reactor vessel 51 to circulate the fluid from the cold pool 55 into the reactor core 52. While the pumps 53 pump the fluid from the cold pool 55 into the reactor core 52 during normal operation, the fluid flow automatically maintains the level X2 of the fluid in the cylinders 61 lower than the level X1 of the fluid in the hot pool 56 and prevents undesirable heat loss through DHX during normal reactor operation. This feature will be explained later in detail.

Figure 11:
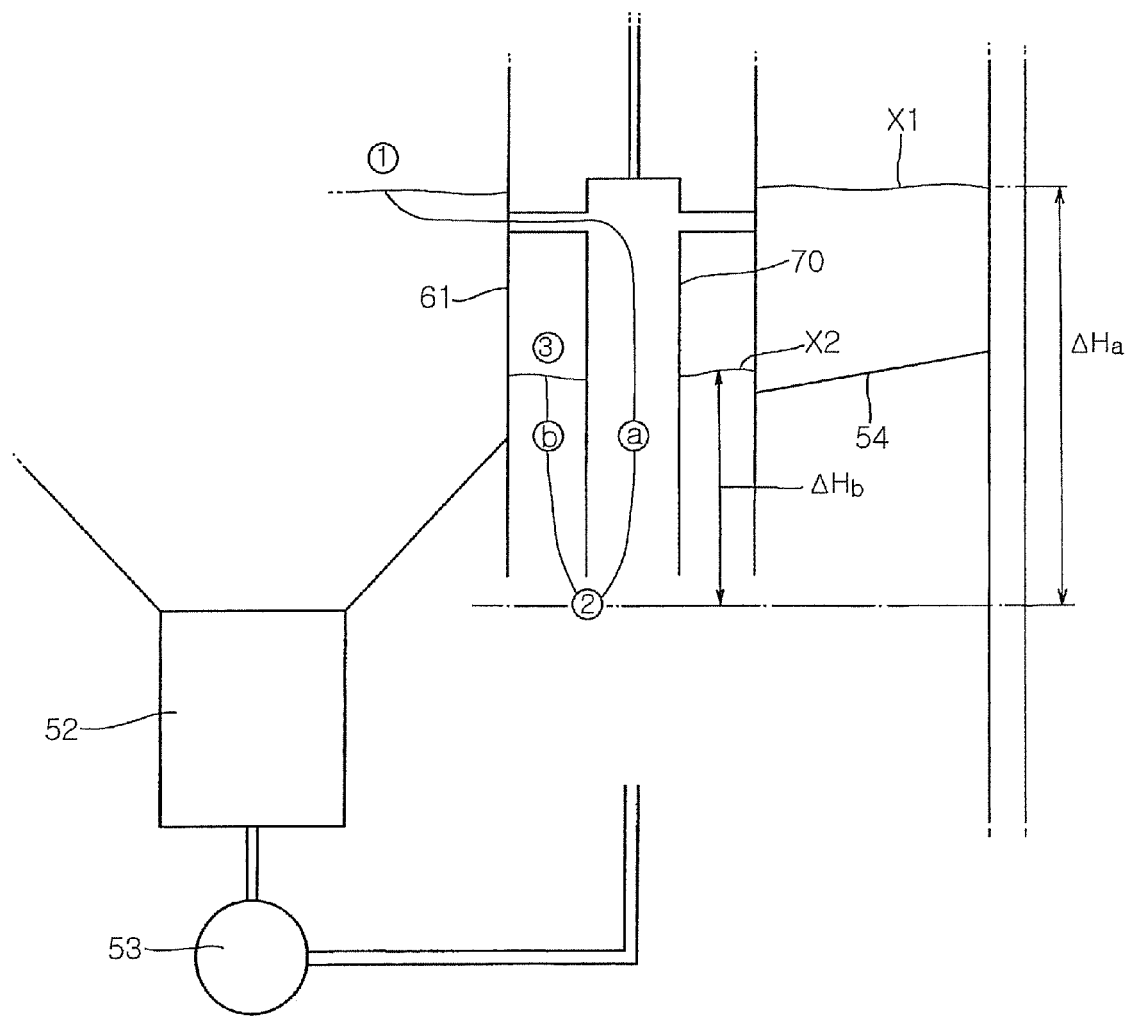
FIG. 11 is a schematic view illustrating a principle of forming different levels of the fluid in the cylinder and the hot pool of the present invention.

FIG. 11 is a schematic view illustrating the principle of forming different levels of the fluid in the cylinder 61 and the hot pool 55 of the present invention during the operation of the pump. The following discussion explains the vertical pressure distribution between a point □ and a free surface, in which the point □ is positioned at the bottom portion of the annular space in which the heat transfer tubes of the DHX 80 are arranged, as well as the bottom portion of the IHX 70.

The pressure at the point □ can be described by Equations 1 and 2 below:

$$P_{2a} = P_1 + \rho g \Delta H_a - (\rho v_a^2)/2 \qquad \text{Equation 1, and}$$

$$P_{2b} = P_3 + \rho g \Delta H_b - (\rho v_b^2)/2 \qquad \text{Equation 2,}$$

wherein $P_{2a}$ is obtained by the integral path from the point □ on the hot pool free surface to the point □ along the IHX path, and $P_{2b}$ is obtained by an integral path from the point □ on the free surface to the point □ along the annular space path, in which the heat transfer tubes of the DHX 80 therein are arranged.

When the pump 53 is operated, the velocity $v_a$ of the fluid flowing in the IHX is considerably high, but the velocity $v_b$ of the fluid flowing in the space, in which the heat transfer tube of the DHX 80 therein is arranged, is practically zero. Accordingly, Equation 2 above is expressed as Equation 3 below:

$$P_{2b} = P_3 + \rho g \Delta H_b \qquad \text{Equation 3.}$$

Since $P_{2a}$ and $P_{2b}$ denote the pressure at the same point, they need to be the same, and thus are expressed as Equation 4 below:

$$P_1 + \rho g \Delta H_a - (\rho v_a^2)/2 = P_3 + \rho g \Delta H_b \qquad \text{Equation 4.}$$

Since the pressures at the point □ and the point □ are pressures on the free surface exposed to the gas inside the reactor, $P_1 = P_3$ and thus Equation 5 below is obtained:

$$\Delta H_b = \Delta H_a - (v_a^2)/2g \qquad \text{Equation 5.}$$

When the pump 53 is operated, the relation of $\Delta H_a \square \Delta H_b$ is obtained due to the velocity of the fluid. Accordingly, the fluid level X2 in the cylinder becomes much lower than the fluid level X1 in the hot pool. However, when the pumps 53 are not operated such as during an accident, the velocity of the fluid flowing in the IHX 70 reaches approximately zero, and thus $\Delta H_a$ and $\Delta H_b$ become nearly the same ($\Delta H_b \square \Delta H_a$). This means that the fluid in the cylinder 61 rises to the level X1 of the fluid in the hot pool when the pump 53 is stopped.

Accordingly, when the pump 53 is operated, during normal reactor operation, the level X2 of the fluid in the cylinder 61 is maintained much lower than the level X1 of the fluid in the hot pool 56 so that the heat transfer tubes of the DHX 80 do not contact the fluid in the reactor 50. When the pump 53 is stopped, the level X2 of the fluid in the cylinder 61 rises to the level X1 of the fluid in the hot pool 56 so that the heat transfer tubes of the DHX 80 contact the fluid in the reactor 50.

Operation of Decay Heat Removal System

Figure 7A:
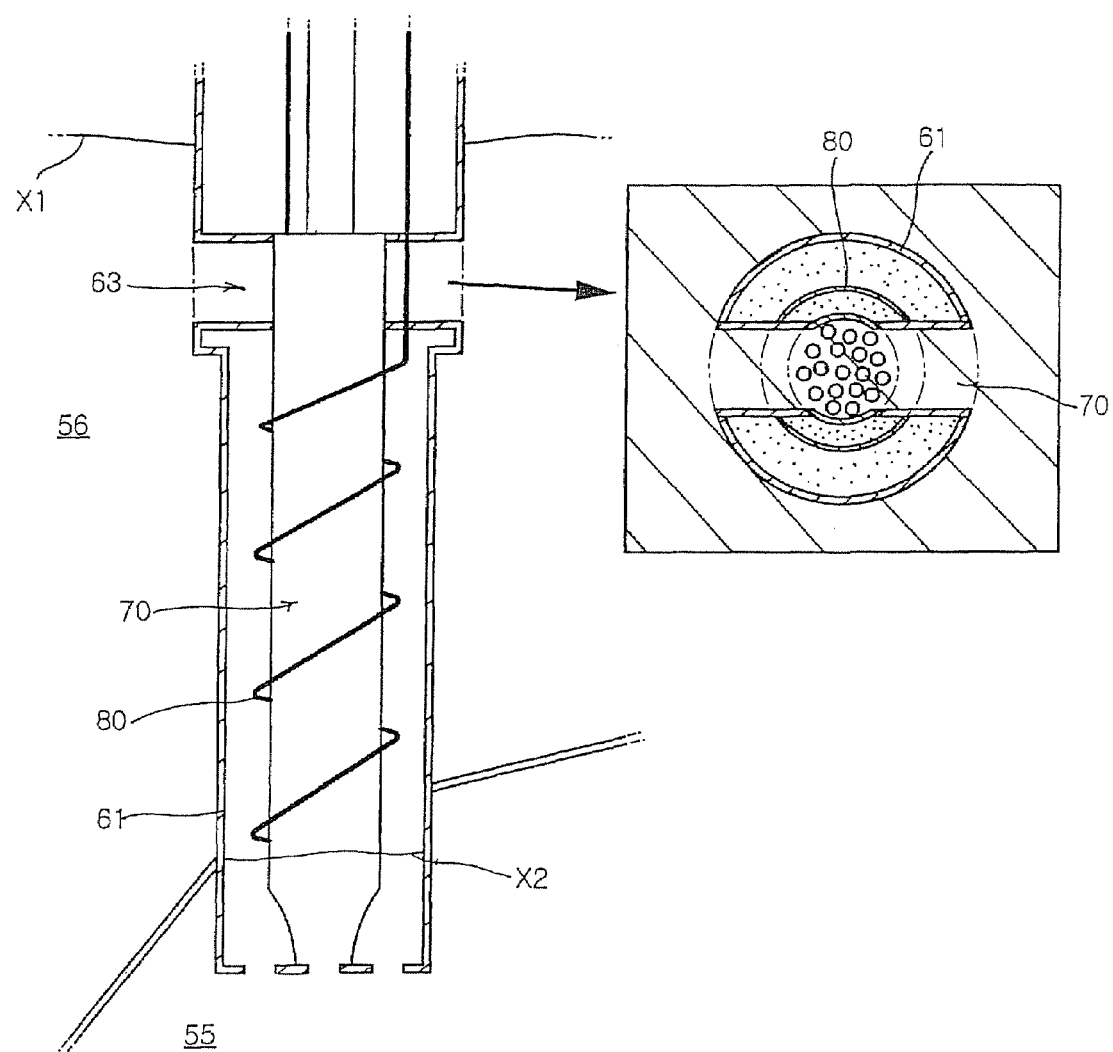
Figure 7B:
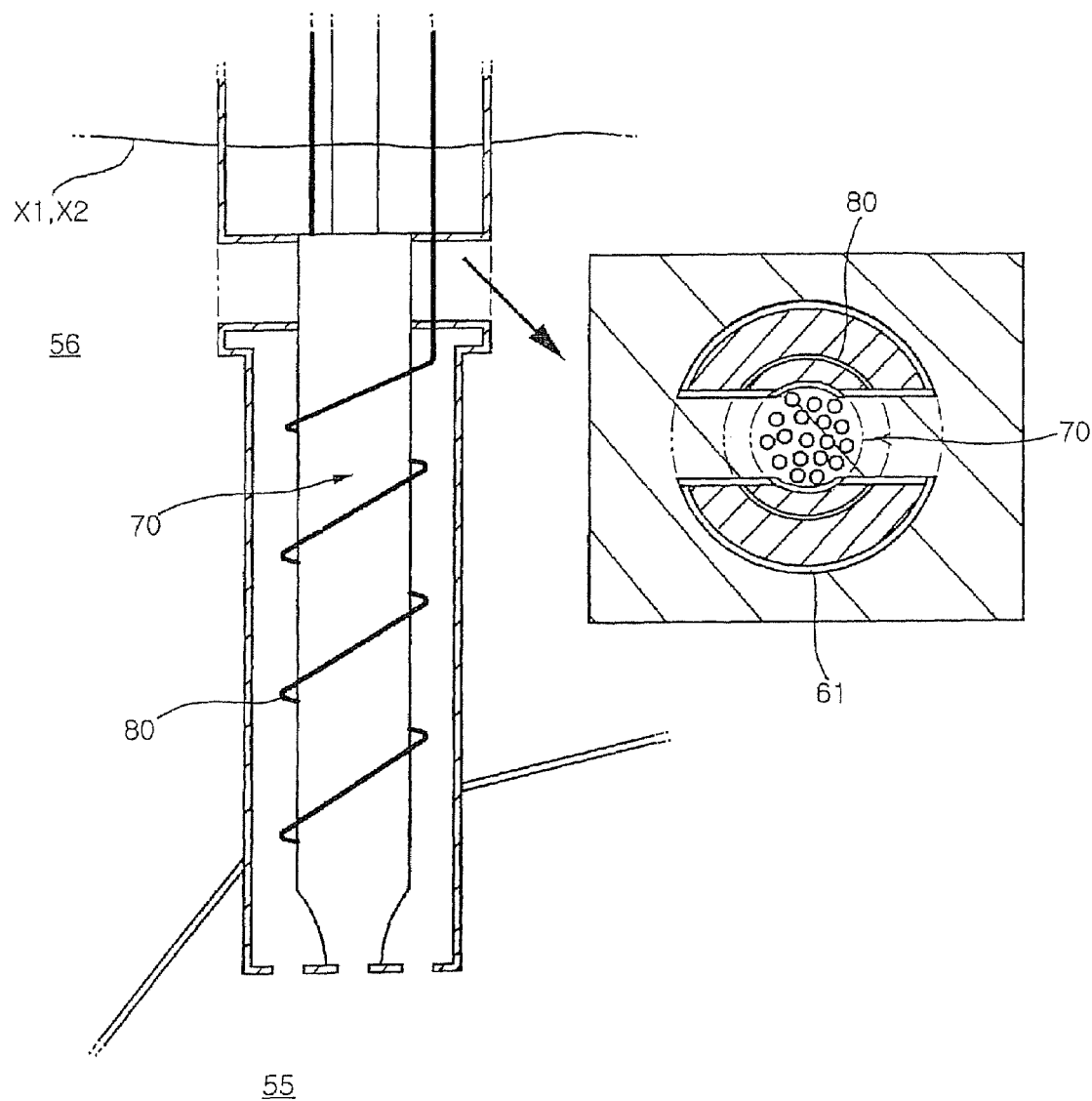

As described above, the decay heat removal system of the present invention comprises the IHXs installed in the reactor vessel and the DHXs surrounding the IHXs. Both of the IHXs and DHXs are arranged within the same cylinders. Here, the operation of the decay heat removal system of the present invention will be described in detail with reference to FIGS. 7a and 7b. FIGS. 7a and 7b illustrate the operation of the decay heat removal system of FIG. 3, and more particularly, FIG. 7a illustrates the decay heat removal system during normal operation in a pool type reactor, and FIG. 7b illustrates the decay heat removal system during an accident in a pool type reactor.

It is necessary to design the DHX 80 so that the heat transfer rate by the DHX during normal reactor operation, that is, the heat loss during normal operation is minimal but is sufficiently large to achieve sufficient reactor core cooling during an accident.

For this purpose, the DHX 80 is placed within the cylinder 61 isolating its heat transfer tubes from the fluid in the hot pool 56 and also its heat transfer tubes are separated from the IHX 70 by a designated distance in a radial direction in order to avoid direct contact with the IHX 70. In a vertical direction, the DHX 80 is isolated from the fluid in the reactor 50 based upon the different fluid levels formed by the operation of the pump 53 as above. That is, as shown in FIG. 7a, the level X2 of the fluid in the cylinder 61 from the cold pool 55 is lower than the level X1 of the fluid in the hot pool 56 during normal reactor operation. Accordingly, the heat transfer tubes of the DHX 80 are placed in gas filled in the reactor 50 without contacting the fluid in the cold pool. In this case, the cylinder 61 is filled with inert gas such as helium, nitrogen, argon and etc. The inert gas prevents direct contact of the fluid in the pool such as sodium with air to avoid chemical reaction. Also, the inert gas can achieve thermal shielding since it has poor heat transfer characteristics.

In normal operation of the reactor 50, the fluid is fed from the hot pool 56 into the IHX 70 through the guide pipe 63, discharges its heat in the IHX 70, and is then fed to the cold pool 55. Because the DHX 80 does not contact the fluid in the hot pool 56 or in the cold pool 55 as shown in FIG. 7a, the heat transfer in the DHX 80 is made only by the very inefficient gas convection or radiation. As a consequence, the entire quantity of the heat transfer made in the DHX 80, that is, the heat loss during normal operation of the reactor 50, becomes negligibly small.

In an abnormal state, i.e., in an accident of the reactor 50, the pumps 53 are stopped by a reactor protection system (not shown), and the level X2 of the fluid in the cylinder 61 becomes approximately the same as the level X1 of the fluid in the hot pool 56. It means the cylinder 61 is filled with the fluid from the cold pool 55 and the heat transfer tubes of the DHX 80 come to have direct contact with the fluid of the cold pool 55 so that heat transfer can be effectively made. The fluid level elevation in the cylinder 61 as above is immediately formed when the pump 53 is stopped in an accident.

Since the normal heat transfer path of a plant, that is, reactor core—IHX—IHTS—steam generator—condenser—atmosphere is for normal reactor operation, its design is made with much emphasis on plant economics while less emphasis is given to safety. Consequently, the normal heat transfer path is not formally credited for assessing the plant safety at an accident, and a nuclear plant should be able to remove the core decay heat only by the system dedicated for the decay heat removal, such as the decay heat removal system of this invention, without using the normal heat transfer path. That is, it is preferable not to consider decay heat removal through the IHX during the accident, though some of the reactor core decay heat would be extracted by the IHX.

In an accident, the decay heat will be removed as follows. When the reactor has an accident, the pumps 53 are stopped by a reactor protection system (not shown). Then, the level of fluid in the annular space of the DHX 80 is raised so that the heat transfer tube of the DHX 80 is submerged into the fluid in the reactor 50. The hot fluid in the hot pool 56 from the reactor core 52 flows into the IHX 70 via natural. Heat of the fluid entered in the IHX 70 is transferred to the fluid filled in the cylinder 61 through the wall of the IHX 70, and then to the heat transfer tubes of the DHX 80. Here, since the fluid is made of liquid metal such as sodium having a high heat transfer coefficient, it can efficiently transfer heat to the DHX 80. The heated fluid inside the heat transfer tubes of the DHX 80 flows to an external heat exchanger (not shown) placed outside the reactor 50, and after being cooled by the air of the external heat exchanger, is circulated again into the DHX 80 inside the reactor 50 by the natural circulation, thereby forming a natural and continuous heat transfer cycle. Also explaining the fluid in the reactor side, after being cooled through the heat exchange with the DHX 80, the fluid flows from the IHX 70 into the cold pool 55, and into the reactor core 52 and then is heated by the decay heat, and then is circulated into the hot pool 56 and the IHX 70. The above fluid circulation has two flow segments, i.e., a high-temperature segment from the reactor core 52 through the hot pool 56 to the DHX 70 and a low-temperature segment from the DHX 70 through the cold pool 55 to the reactor core 52. At the two segments there are definite and stable heating and cooling, respectively, and thereby stable and passive natural convection cooling of the core can be achieved. Also, the initiation of the decay heat removal by the DHX 80 of the present invention is made purely passively without relying on any operator action or external power supply.

Figure 1:
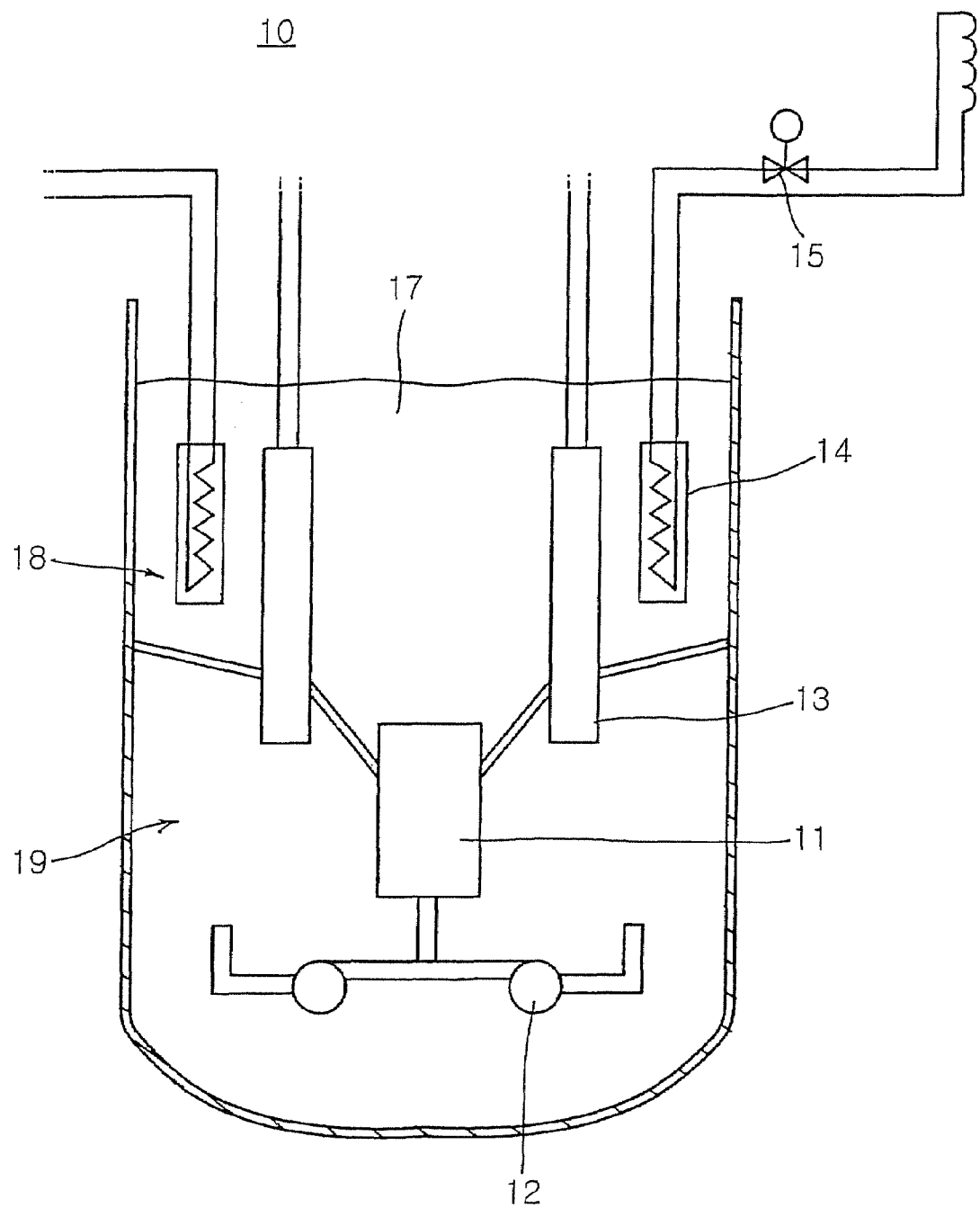
FIG. 1 is a longitudinal-sectional view of a conventional active decay heat removal system.
Figure 2:
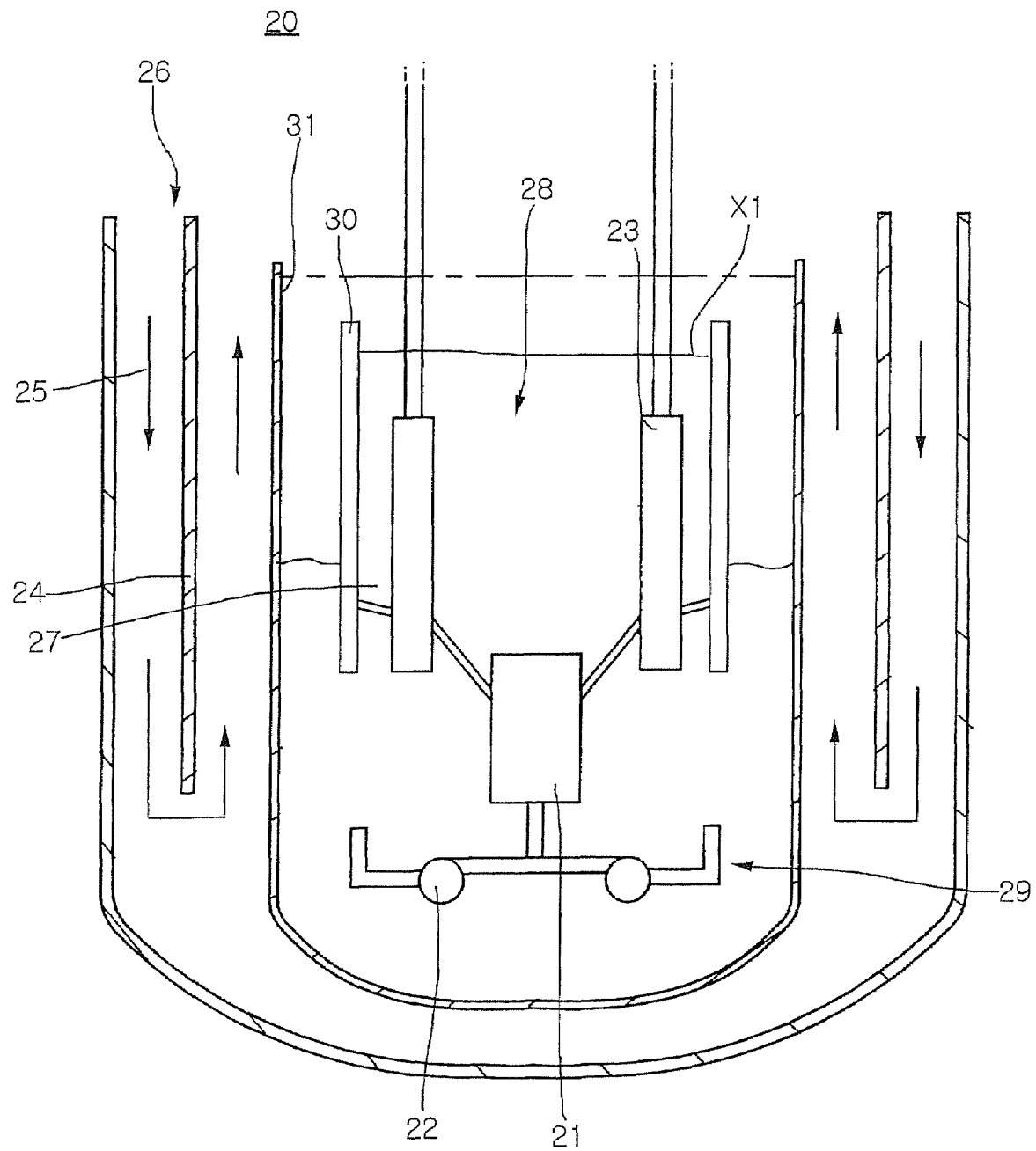
FIG. 2 is a longitudinal-sectional view of a conventional passive decay heat removal system.

Further, the decay heat removal system of the present invention performs the decay heat removal function immediately after the reactor has an accident. In the conventional decay heat removal system shown in FIG. 2, the heat transfer for removing decay heat is performed only after the temperature rises to the extent that the fluid in the hot pool 28 expands and floods into the cold pool 29 to form a decay heat removal circuit. This requires a long time before initializing the decay heat removal system, and thus has difficulty in immediately coping with an accident. However, in the decay heat removal system of the present invention, the level of the fluid in the cylinder rises immediately after the stoppage of the pumps, and contacts the DHX, thereby forming an efficient decay heat removal circuit. Accordingly, the decay heat removal system of the present invention immediately copes with an accident of the reactor.

In addition to the immediate removal of the decay heat in the reactor, the decay heat removal system of the present invention further has several advantages, as follows.

1) Stable Cooling of Reactor Core

In the conventional system as described above, the decay heat removal is not effectively made until the fluid temperature increases to the extent of expansion so that the flow over the overflow slot is formed. Accordingly, a cooling source is not clear during that period of the expansion, and the formation of the natural convection head required for cooling the reactor core is unreliable. Thereby, the local temperature in the reactor core can exceed a limit value even though the mean temperature of the fluid in the reactor remains under the limit value. However, the decay heat removal system of the present invention performs decay heat removal immediately after the accident of the reactor and presents a cooling source clear, thereby reliably forming a route for natural convection through the reactor core. Accordingly, the decay heat removal system of the present invention overcomes the unreliability of the convention system in order to stably cool the reactor core.

2) Prevention of Exposure of Internal Structure of Reactor to High Temperature

In the conventional system, the decay heat removal is performed only after the fluid in the reactor is heated to a designated temperature or more. However, the decay heat removal system of the present invention operates immediately after the occurrence of an accident without waiting for the fluid temperature increase to a designated value or more. This can limit the maximum temperature of an internal structure of the reactor remarkably below a limit temperature as well as remarkably shorten the exposure time of the internal structure to high temperature and reduce heat load to the internal structure, thereby improving the mechanical integrity of the internal structure.

In an accident, the fluid passing through the IHX in the conventional system does not remove the decay heat from the reactor, but merely connects the hot pool with the cold pool. This reduces the temperature difference between a high-temperature region and a low-temperature region in the reactor, making it difficult to build up a fluid head for natural convection required to cool the reactor core in an accident and deteriorating a cooling capacity. However, the present invention allows the fluid passing through the IHX to be cooled also via the heat transfer to the DHX.

The reactor protection system is designed to automatically trip the pumps when there is an accident to prevent the heat input from the pumps to the system. In the case of an extremely unlikely event of multiple failures, in which the reactor protection system is not enabled either, the decay heat removal system of the present invention operates similar to the conventional decay heat removal system. That is, when the fluid in the hot pool 56 of the reactor 50 expands according to temperature growth to the extent of flowing over the top of the cylinder 61, the hot fluid from the hot pool 56 directly contacts the heat transfer tube of the DHX 80, thereby to efficiently remove decay heat. In this case, since the pumps 53 are operated, the fluid is fed at a sufficient flow rate to the reactor core 52, thereby to prevent the above-described problem in that the reactor core is of locally overheated. That is, the decay heat removal system of the present invention stably cools the reactor core 52 in any type of accidents including the exceptional multiple failures.

The decay heat removal system in accordance with the first embodiment of the present invention has been described. Hereinafter, a decay heat removal system in accordance with a second embodiment of the present invention will be described in detail. In addition to the structure of the decay heat removal system of the first embodiment, the decay heat removal system of the second embodiment further comprises a switch valve, which is operated based on the action of the pumps, in order to enhance the cooling function.

Operation of Switch Valve of Decay Heat Removal System

Figure 8:
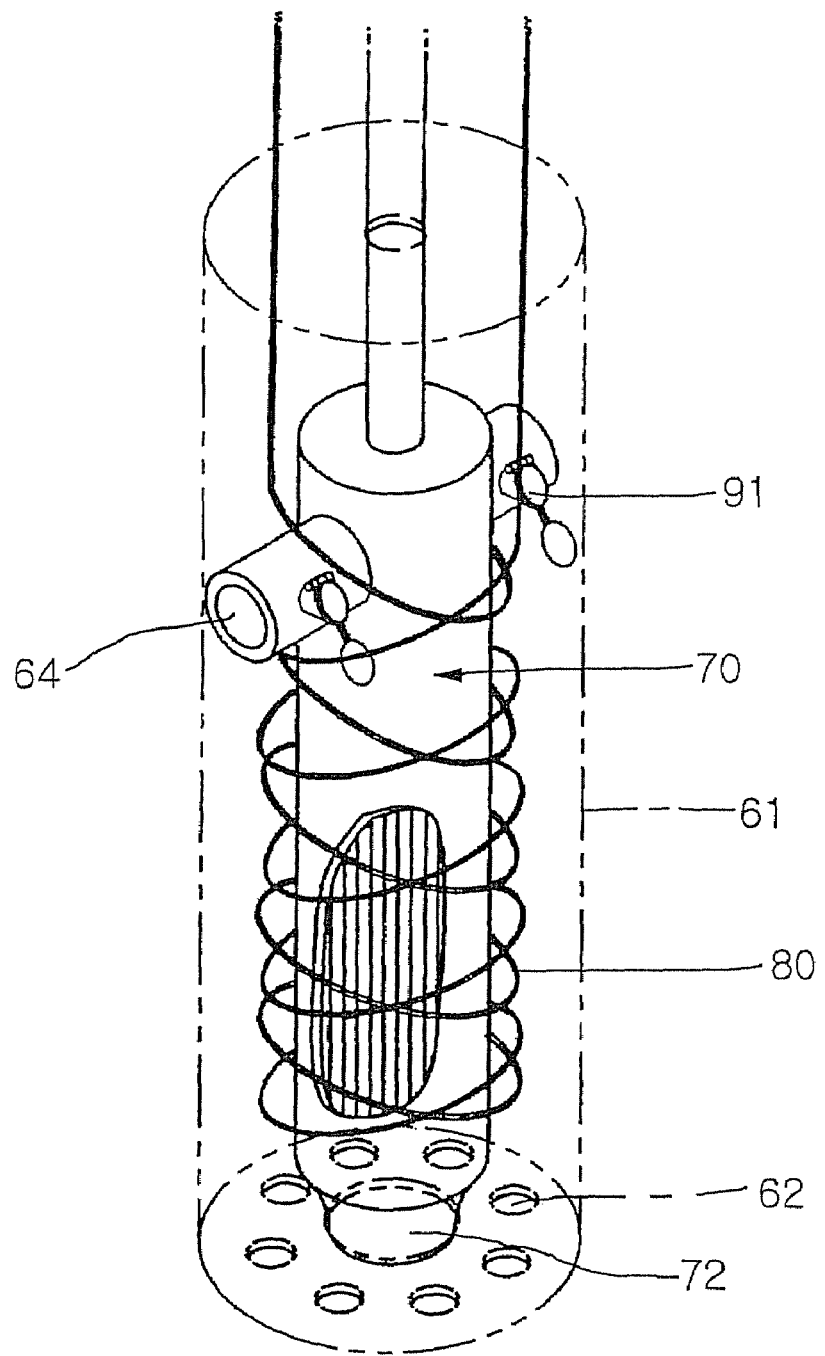
FIG. 8 is a perspective view of a decay heat removal system for a pool type reactor in accordance with the second embodiment of the present invention.
Figure 9:
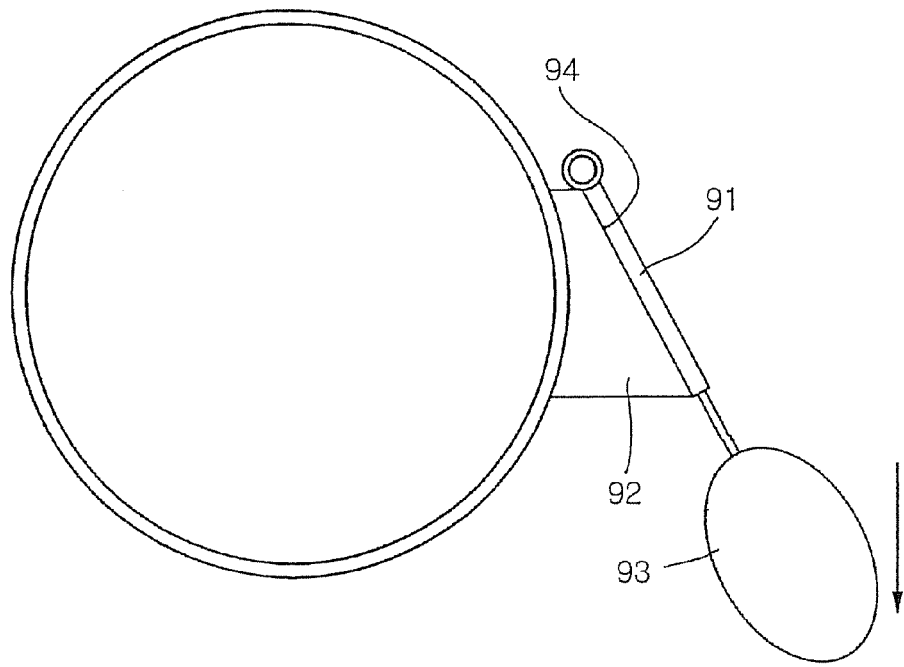
FIG. 9 is a cross-sectional view of a switch valve of FIG. 8 during normal operation.
Figure 10:
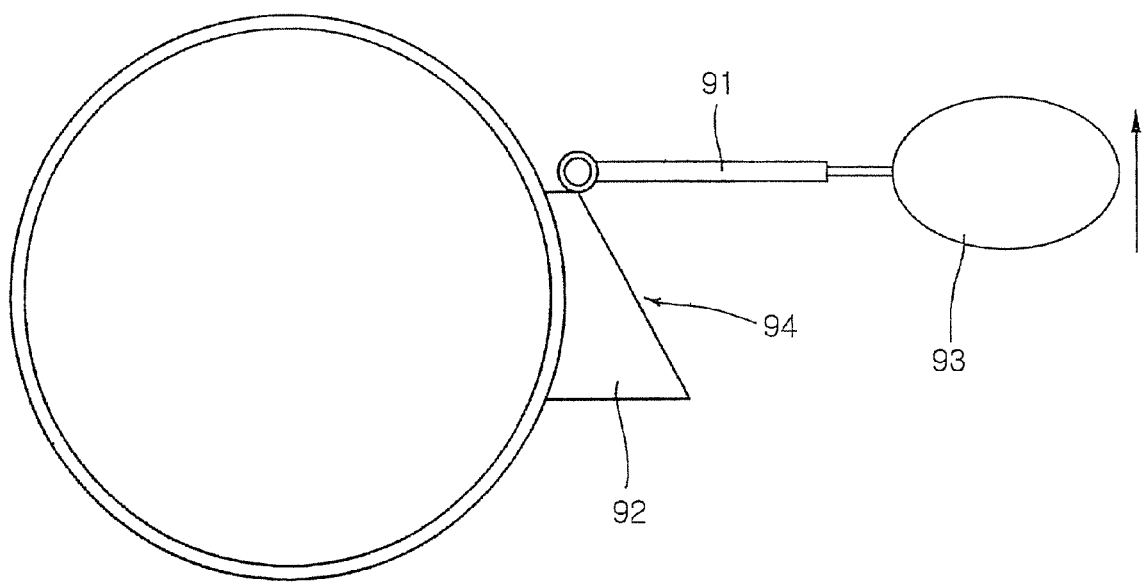
FIG. 10 is a cross-sectional view of the switch valve of FIG. 8 in an accident.

FIG. 8 is a perspective view of a decay heat removal system for a pool type reactor in accordance with the second embodiment of the present invention, FIG. 9 is a cross-sectional view of the switch valve of FIG. 8 during normal operation, and FIG. 10 is a cross-sectional view of the switch valve of FIG. 8 in an accident.

The decay heat removal system of the second embodiment of the present invention comprises a switch valve for allowing the fluid in the hot pool to circulate directly into the cylinder.

The reactor vessel, the IHX 70, the DHX 80 and the pump of the decay heat removal system in this embodiment have the same structures as those in the first embodiment. The components in this embodiment shown in FIG. 8, which are substantially the same as those in the first embodiment, are denoted by the same reference numerals even though they are depicted in different drawings.

A switch valve 91 is installed on the outer wall of the guide pipe 64 in the cylinder 61. A through hole 94 is formed through the guide pipe 64 of the cylinder 61 so that the fluid flowing from the hot pool to the IHX 70 is introduced into the cylinder 61 therethrough. When the switch valve 91 is opened from the through hole 94, the fluid in the hot pool flows through the through hole 94 into the cylinder 61, in which the DHX 80 is installed, thereby forming a flow path from the hot pool to the cylinder 61.

Here, the through hole 94 is formed in an inclined surface of an inlet 92 protruded from the outer circumference of the cylinder 61. The inlet 92 protrudes from the guide pipe 64 such that the lower surface of the inlet 92 has the longest length and the upper surface of the inlet 92 has the shortest length, thereby obtaining the inclined surface, which is closed by the switch valve 91. The above inclination of the inclined surface of the inlet 92 allows the switch valve 91 to steadily close the inlet 92 by means of the weight load of the valve and the buoy 93 which is described below.

The switch valve 91 is hinged to the upper part of the inlet 92. A buoy 93 is attached to the switch valve 91 to be floated on the fluid by buoyancy. The buoy 93 is designed heavy enough to withstand the pressure of the fluid in the guide pipe 64 so that the inlet 92 is closed by the switch valve 91 during normal operation. That is, as shown in FIG. 9, the force for closing the switch valve 91 by means of a moment of the buoy 93 is larger than the force for opening the switch valve 91 by means of the pressure of the fluid acting inside the switch valve 91. This prevents the fluid from flowing into the decay heat removal system in normal operation.

Also, the switch valve 91 is designed to be automatically opened by the buoyancy acting on the buoy 93 as shown in FIG. 10 when the cylinder 61 is filled with the fluid in an accident of the reactor. The buoy 93 has a volume sufficient to automatically open the switch valve 91 by the buoyancy. That is, the buoy 93 has a structure of a balloon containing a weight, with a weight sufficient to maintain the closed position of the switch valve 91 against the pressure of the fluid in the guide pipe 64 if surrounded by gas, and a volume sufficient to completely open the switch valve 91 by means of the buoyancy if floated on the fluid in the cylinder 61. Here, the volume of the buoy 93 sufficient to completely open the switch valve 91 means that the mean density of the buoy 93 is much lower than the density of the fluid.

Operation of Switch Valve of Decay Heat Removal System

In the decay heat removal system of this embodiment of the present invention, the switch valve 91 is closed when the reactor operates normally. When the reactor operates normally, the level X2 of the fluid in the cylinder 61 is much lower than the level X1 of the fluid in the hot pool 56 as shown in FIG. 7a, and the heat transfer tubes of the DHX 80 lose contact with the fluid of the pool but are exposed to gas. Accordingly, as described above, the efficient heat transfer in the DHX cannot be made and the heat loss during normal operation becomes negligible.

This means that the switch valve 91 is closed as shown in FIG. 9. In gas, the weight of the buoy 93 generates a clockwise moment which closes the switch valve 91 larger than the counterclockwise moment from the pressure of the fluid in the guide pipe 64 which opens the switch valve 91, in order to maintain the closed position of the switch valve 91.

When the reactor has an accident, the level X2 of the fluid in the cylinder 61 rises up to the level X1 of the fluid in the hot pool as shown in FIG. 7b. This means that the inside of the cylinder 61 is filled with the fluid and the switch valve 91 is affected by the fluid. When the buoy 93 of the switch valve 91 rises by the buoyancy of the fluid, the switch valve 91 is opened as shown in FIG. 10 so that the fluid flows from the hot pool into the cylinder 61.

When the fluid in the hot pool flows into the cylinder 61 through the switch valve 91, a flow path from the hot pool into the cold pool is formed, and the fluid from the hot pool directly contacts the heat transfer tubes of the DHX 80, thereby forming an efficient heat transfer path for removing decay heat. Such a heat transfer path is used together in parallel with the heat transfer path between the fluid passing through the IHX and the heat transfer tubes of the DHX as described in the above first embodiment. Accordingly, the decay heat removal system of the second embodiment can have enhanced decay heat removal capability while maintaining those advantages of the decay heat removal system of the first embodiment.

As is apparent from the above description, the present invention provides a decay heat removal system which works on the natural convection and completely passively without relying on any operator action or external support in an accident.

Further, the decay heat removal system of the present invention is designed to operate immediately after an accident without losing the complete passivity by utilizing the natural level rise at the trip of the pump.

Accordingly, the decay heat removal system of the present invention eliminates the uncertainty in cooling the reactor core at an early stage of an accident, thus improving the plant safety, and shortens the time of an internal structure of the reactor exposed to high temperature and lowers the maximum temperature of the internal structure, thus improving the mechanical integrity of the internal structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A decay heat removal system for a liquid metal reactor comprising:
    a reactor vessel including a hot pool for containing a high-temperature fluid discharged from a reactor core and a cold pool which is separated from the hot pool by a partition and contains a low-temperature fluid;
    an intermediate heat exchanger (IHX) for transferring heat from the hot pool to an external steam generation system and positioned in the hot pool, the IHX having an upper portion communicating via a guide pipe with the hot pool and a bottom portion communicating with the cold pool for discharging the fluid from the hot pool into the cold pool after extracting heat from said fluid;
    a cylinder surrounding the IHX and defining an annular space therearound, and having an open top portion extending above a level of the fluid in the hot pool, and a bottom portion communicating with the cold pool;
    the guide pipe extending through said annular space of the cylinder and communicating at a first end with the hot pool and communicating at a second end with the upper portion of the IHX for allowing passage of the fluid from the hot pool into the IHX;
    a decay heat exchanger (DHX) positioned in the annular space of the cylinder surrounding said IHX and spaced from the IHX by a designated distance for transferring reactor core decay heat to external air;
    a switch valve installed on an outer wall of the guide pipe in the cylinder and having a buoy floatable on the fluid by buoyancy to switch a flow path from the guide pipe into the annular space of the cylinder; and
    a pump arranged in the cold pool for pumping the fluid from the cold pool to the reactor core and to the hot pool and evacuating the annular space of the cylinder through the bottom portion of the cylinder to lower a level of fluid in the cylinder under the level of the fluid in the hot pool and under the DHX by virtue of a pressure differential between the hot pool and the cold pool caused by normal operation of the pump, whereby, upon pump failure, the level of fluid in the cylinder rises to contact the DHX and the switch valve is opened so that the fluid flows from the hot pool into the annular space of the cylinder, thereby allowing conduction heat transfer from the IHX to the DHX and from the fluid flowed into the annular space to the DHX, and thus transferring the reactor core decay heat to external air by the DHX is enabled.

2. The decay heat removal system as set forth in claim 1, wherein the guide pipe includes a through hole formed by an inlet having an inclined surface protruding from the wall of the guide pipe, wherein a lower surface of the inlet has a longer length than an upper surface of the inlet.

3. The decay heat removal system as set forth in claim 1, wherein the buoy has a weight sufficient to withstand a pressure of the fluid from inside the guide pipe acting on the switch valve when the switch valve is in a closed position.

4. The decay heat removal system as set forth in claim 3, wherein the buoy has a mean density lower than that of the fluid in the hot and cold pools.

* * * * *